Figures 1, 2:
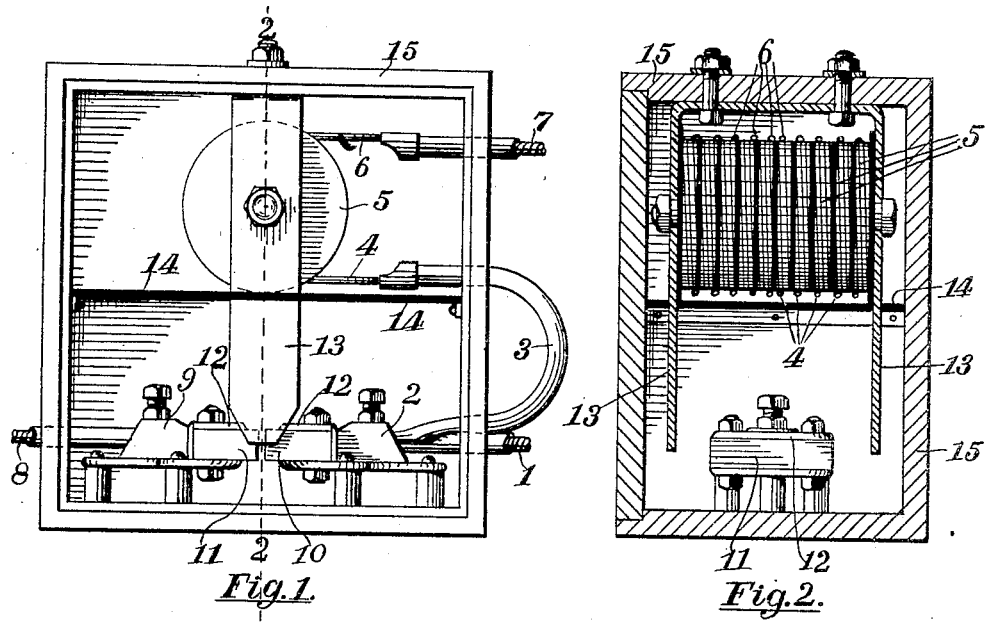

No. 879,522. PATENTED FEB. 18, 1908.
G. W. CLARK.
LIGHTNING ARRESTER.
APPLICATION FILED APR. 26, 1907.

Witnesses
Vernon J. Lilly.
Georgiana Chace

Inventor
George W. Clark
By Luther V. Moulton
Attorney

UNITED STATES PATENT OFFICE.

GEORGE W. CLARK, OF GRAND RAPIDS, MICHIGAN, ASSIGNOR OF ONE-FOURTH TO JAMES B. DOYLE, OF GRAND RAPIDS, MICHIGAN.

LIGHTNING-ARRESTER.

No. 879,522.      Specification of Letters Patent.      Patented Feb. 18, 1908.

Application filed April 26, 1907. Serial No. 370,346.

*To all whom it may concern:*

Be it known that I, GEORGE W. CLARK, a citizen of the United States of America, residing at Grand Rapids, in the county of Kent and State of Michigan, have invented certain new and useful Improvements in Lightning-Arresters; and I do hereby declare the following to be a full, clear, and exact description of the invention, such as will enable others skilled in the art to which it appertains to make and use the same.

My invention relates to improvements in lightning arresters, and its object is to provide a device that will effectually ground a lightning charge without being damaged thereby, and to provide the same with various new and useful features hereinafter more fully described and particularly pointed out in the claims.

I have observed that a charge of lightning coming in on a line or other like conductor has a tendency to proceed in right lines in the direction of the conductor on which it flows and will arc through a greater air resistance in such direction rather than laterally of the conductor. I have also found that if a conductor be divided into a number of smaller and insulated parts, and lightning comes in on the same, that the tendency of the current is to follow one or more of the most direct subdivisions, rather than to divide equally on the same and that a number of coils of small wire connected in parallel is better than a single coil of larger wire. I avail myself of these modes of operation of lightning, by providing a device having an abrupt return direction in the conductor on which the lightning is liable to come in and locating this return bend close to the terminals which are spaced apart and across which space the lightning is to form an arc and escape to a grounded conductor. I also provide in the circuit between these terminals and the device to be protected, preferably where the coils are formed to excite the blow-out magnet, a divided and insulated portion having collectively substantially the same conducting capacity consisting of a number of small wires connected in parallel and as the main line and formed into separate insulated coils, the coils thus having a greater number of coils than a single large conductor. The result is an increased efficiency of the choke coil over a coil of a single large wire of like conductivity to the entire series of small wire. I thus effect the escape of the surplus electricity without introducing a restricted or reduced conductor in any part of the circuit, or between the circuit and the ground. I also thus provide a device that will carry off a large quantity of electrical discharge when the line is struck by lightning without interference with the normal operation of the circuit or damage to the device.

Figures 3, 5:
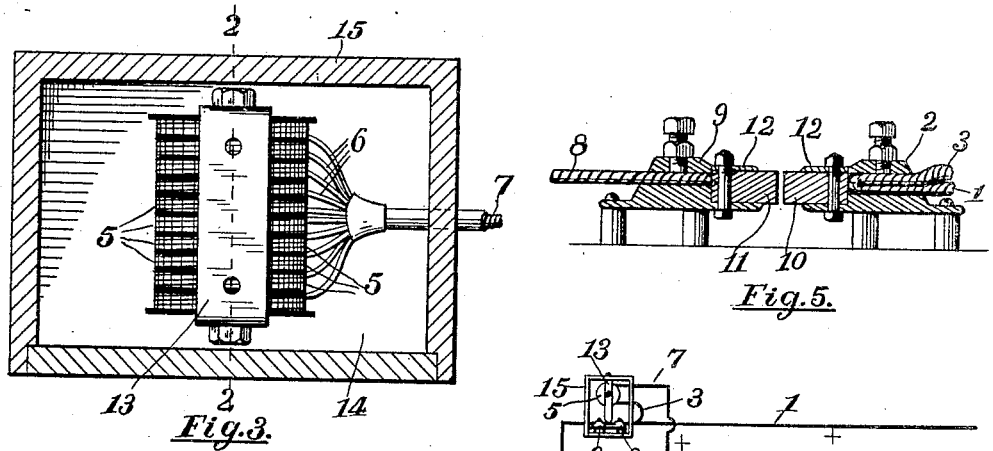
Figure 6:
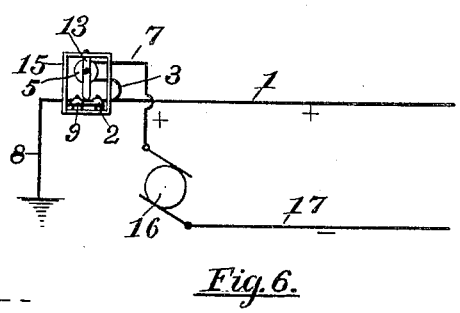
Figure 4:
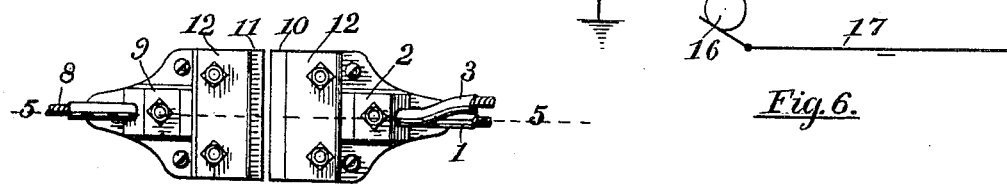

Referring to the drawings, herewith: Figure 1. is a front elevation of a device embodying my invention; Fig. 2. a vertical section of the same on the line 2—2 of Figs. 1 and 3; Fig. 3. a plan view with the top of the case removed; Fig. 4. a detail in plan view of the terminals; Fig. 5 a vertical section of the same on the line 5—5 of Fig. 4: and, Fig. 6. a diagram representing the arrangement of the circuit and a generator or dynamo to be protected.

Like numbers refer to like parts in all of the figures.

1 represents the main line conductor positively excited by a dynamo generator 16; 2 a socket in which this line is inserted and abruptly returned upon itself, and thence extending in a loop 3 returns within the case 15 where it is divided into any preferred number of separate insulated conductors having the same aggregate conductivity of the main line 7 as at 4 and 6. These divided or smaller conductors are each separately coiled side by side around a suitable core to excite the blow-out magnet 13 between the poles of which are located two carbon terminals 10 and 11 securely held in circuit with the sockets 2 and 9 by means of clamps 12. These terminals are spaced apart at their adjacent sides a suitable distance so that when lightning comes in on the line 1, the same will arc across between these terminals and escape to the ground by way of the conductor 8. As soon as the flash of lightning passes, the magnet will blow out the remaining arc and the normal action of the circuit be maintained. Outside of the coils 5 these separate conductors are again joined in one single large conductor 7 and extend to the positive brush of the generator 16 to the opposite brush of which is connected the ground or return side 17 of the circuit.

This apparatus is preferably inclosed in a suitable case 15 and the case divided horizontally near the middle by a diaphragm 14 of suitable material, to protect the coils and conductors in the upper part of the device from the action of the arc between the terminals 10 and 11.

What I claim is:

1. In a lightning arrester, a main line conductor exposed to the action of lightning, a pair of terminals spaced apart one of the same being in circuit with said conductor, a grounded conductor connected to the other terminal, and a portion in said first named conductor between the said terminals and the device to be protected from lightning formed of a series of smaller conductors connected in parallel.

2. In a lightning arrester, a main line conductor exposed to the action of lightning, a pair of terminals spaced apart one of which is in circuit with said conductor and the other connected to a grounded conductor, a series of coils in said circuit and connected in parallel, and a blow-out magnet excited by said coils and having its poles embracing the terminals.

3. In a lightning arrester, an electric circuit the positive side of which is exposed to lightning, a device to be protected connected in said circuit, a pair of terminals spaced apart, one terminal being in said circuit between said device and the exposed portion of the circuit, and the other terminal connected to a grounded conductor, a series of coils in said circuit between the terminals and the negative portion of the circuit and connected in parallel, and a magnet excited by said coils and with its poles embracing the terminals.

In testimony whereof I affix my signature in presence of two witnesses.

GEORGE W. CLARK.

Witnesses:
LUTHER V. MOULTON,
LOIS M. JONES.